June 2, 1942.  R. F. PALMER ET AL  2,284,965
PROCESS OF MAKING DRESS-FORMS
Filed April 27, 1940   2 Sheets-Sheet 1
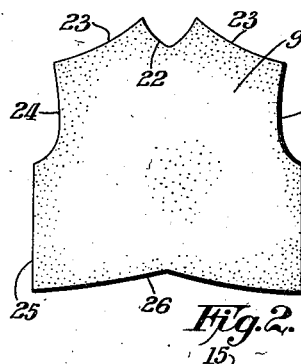
Fig.2.
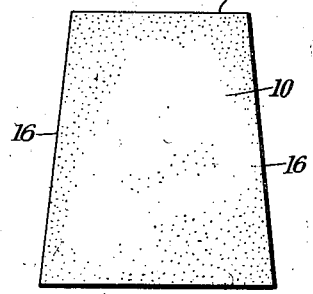
Fig.3.
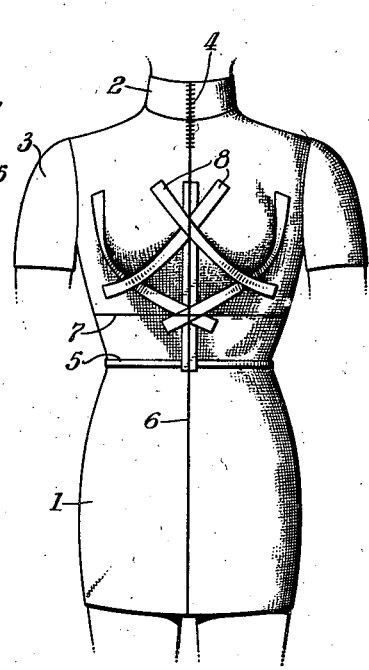
Fig.1.
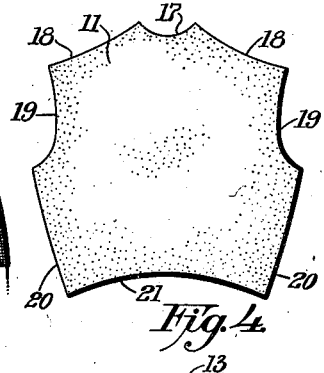
Fig.4.
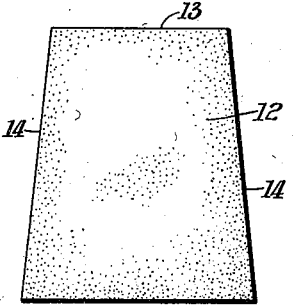
Fig.5.
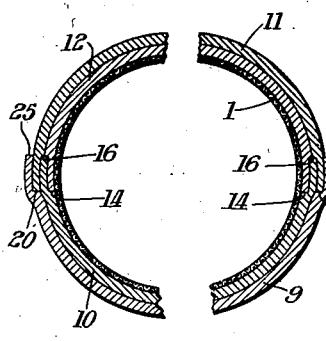
Fig.7.
Fig.8.
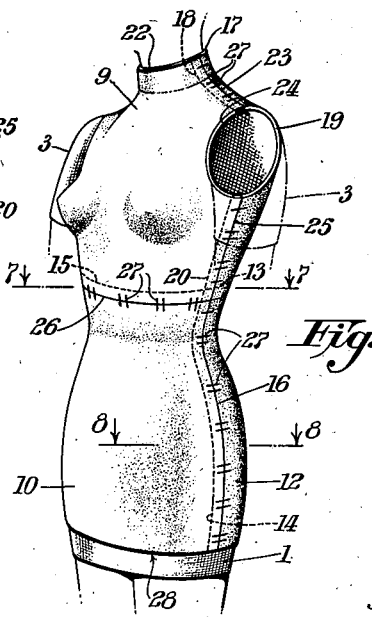
Fig.6.
Inventor
Ralph F. Palmer
and Katherine C. Selby
By Henry J. Miller
Attorney
Witness:
Godfrey Pecina June 2, 1942.   R. F. PALMER ET AL   2,284,965
PROCESS OF MAKING DRESS-FORMS
Filed April 27, 1940   2 Sheets-Sheet 2
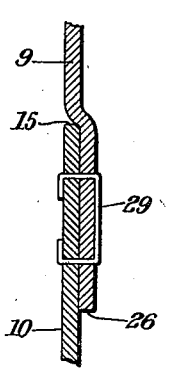
Fig.10.
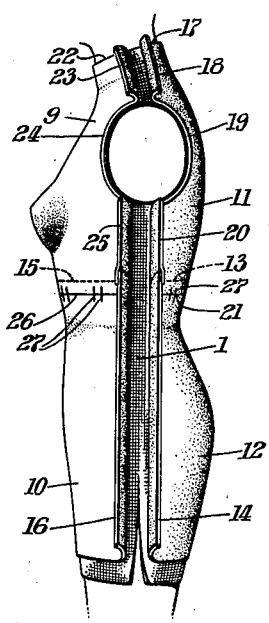
Fig.9.
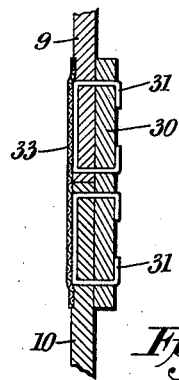
Fig.11.
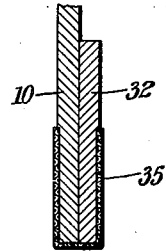
Fig.12.
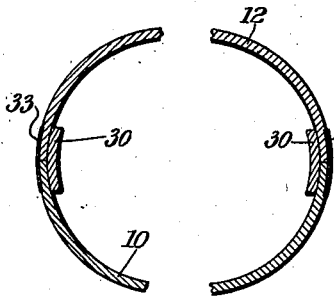
Fig.15.
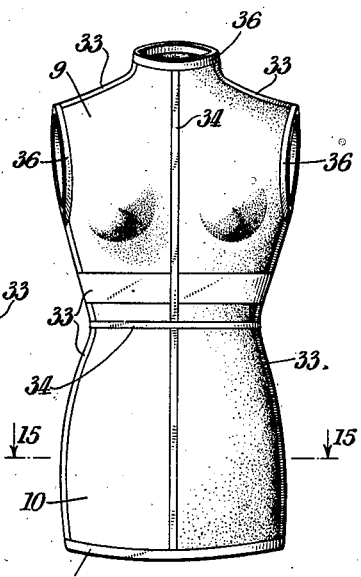
Fig.14.
Fig.13.
Inventor
Ralph F. Palmer
and Katherine C. Selby
By Henry J. Miller
Attorney
Witness:
Josey Pecina Patented June 2, 1942

2,284,965

UNITED STATES PATENT OFFICE 2,284,965

PROCESS OF MAKING DRESS FORMS

Ralph F. Palmer, Montclair, N. J., and Katherine C. Selby, White Plains, N. Y., assignors to The Singer Manufacturing Company, Elizabeth, N. J., a corporation of New Jersey Application April 27, 1940, Serial No. 331,976

9 Claims. (Cl. 223—68)

This invention relates to processes of making dress-forms and the like, and more particularly dress-forms made from human models, the present invention being in the nature of an improvement in the process of making dress-forms as described in the pending U. S. patent application of Stanley P. Lovell, filed Nov. 13, 1939, with Serial No. 304,209.

A primary object of the present invention is to make available a process of producing dress-forms in a commercially practicable manner, and especially to reduce to a minimum the time required of a model in molding a shell conforming closely to the contours of the model and having the characteristic of permanently retaining the molded form thereof.

The invention has for a further object to insure accurate reassembly of the molded hardened shell after separation thereof for removal of the shell from the model. A still further object is to provide a process of assembling the removed shell-sections into an integral dress-form which is free from undesirable ridges and objectionable joining seams. Other and more specific objects of the invention will be apparent from the following description and claims.

The invention consists in the improvements in the process of making a dress-form or the like, as set forth in the appended claims and hereinafter described in connection with the accompanying drawings which are illustrative of the preferred method of procedure and in which:

Fig. 1 is a front side view of primarily the torso portion of a human model provided with a protective vest marked and taped preparatory to application thereto of panel-sections of plastic sheet-materials having the property of hardening. Figs. 2 to 5 inclusive are plan views illustrative of the panel-sections of the sheet-material preferably employed in forming a dress-form shell. Fig. 6 represents a perspective view of the model encased in the overlapping sections of the panel-sections. Fig. 7 represents an enlarged fragmentary cross-section of the shell and protective vest, the section being taken on substantially the line 7—7 of Fig. 6. Fig. 8 represents an enlarged cross-section of the shell and protective vest, on substantially the line 8—8 of Fig. 6. Fig. 9 is a view in side elevation of the model-encasing shell, showing the overlapping panel-section margins separated from each other and a portion of the protective vest severed vertically between said separated margins. Fig. 10 represents an enlarged cross-section of overlapping panel-sections temporarily stapled together after the protective vest has been removed from said panel-sections. Fig. 11 represents an enlarged cross-section of abutted panel-sections as finally joined by stapling, with the staples concealed by a covering tape at the outer side of the shell. Fig. 12 represents an enlarged cross-section of the bound bottom margin of the finished shell. Fig. 13 represents an enlarged cross-section of the marginal portion of a bound arm or neck aperture of the completed shell. Fig. 14 is a front view in elevation of the completed shell. Fig. 15 represents an enlarged fragmentary cross-section of the completed shell, on substantially the line 15—15 of Fig. 14.

In carrying out the present invention, panel-sections of sheet-material in limp conformable condition and having the property of hardening are molded closely to the contours of a model to provide a hardened shell which, when removed from the model and completed, comprises not only an accurate reproduction of the model but also possesses the characteristics of being light and therefore easily handled while, nevertheless, strong and durable in its retention of the configuration of the model.

It is preferred to employ the thermoplastic sheet-material devised by Stanley P. Lovell and described in his patent application hereinbefore referred to, because of its conformability due primarily to its elasticity when limp, its adhesive characteristic, the time factor of its plasticity, and the toughness and lightness of the hardened shell comprising the completed form.

In general, the sheet-material preferably employed comprises a base of knit or other suitable material of high elasticity, said base being impregnated and coated on its opposite faces with a special thermoplastic composition comprising 30 parts of candelilla wax, 10 parts of rubber, 10 parts of beeswax and 50 parts of resin. It is to be understood, however, that in its broader aspects the present invention is not limited to the precise formula of the composition as above specified of, in fact, to a thermoplastic composition, the essential characteristics of the sheet-material being that it shall be limp and readily conformable when plastic and capable of thereafter hardening into a tough and durable shell.

Referring to Fig. 1 of the drawings, a protective vest 1 of suitable material such as wool or cotton knit fabric is donned by a human model preferably, although not necessarily, wearing the usual foundation garments, the vest 1 having a collar portion 2 and sleeves 3. After donning the vest the usual slit thereof which extends downwardly from the upper edge of the collar 2 is closed by stitches 4 disposed so as to cause the collar 2 to closely hug the neck of the model.

A preferably narrow tape 5 is applied to the vest 1 about the natural waistline of the model in a manner to confine the vest closely to the body of the model and to provide for taking measurements. Front and back vertical center lines 6 (the back line not being shown) are marked upon the vest 1, as by chalk or the like. The top of the shoulders from the collar to the sleeves, and vertical side lines from the arm-pits downwardly are also preferably marked. Likewise, the style waistline 7 is marked upon the vest 1 above and substantially parallel to the natural waistline 5. In addition, a plurality of short sections of tape 8, or equivalent devices, are adhesively applied to the vest in a manner to support the breasts against deformation when later applying the panel-sections of sheet-material thereto.

The preparatory steps having been taken, the torso of the model is then encased by panel-sections of the sheet-material described, said panel-sections comprising an upper front-section 9 (Fig. 2) a lower front-section 10 (Fig. 3), an upper back-section 11 (Fig. 4), and a lower back-section 12 (Fig. 5), said sections being preferably shaped as illustrated in the drawings to facilitate application to the model. While it is preferred to employ four panel-sections of the shapes illustrated, to expedite molding of said panel-sections to the model, it is to be understood that in its broader aspects the present invention is not limited to the employment of four panel-sections or to any particular configurations thereof. In their preferred forms the upper panel-sections are cut away to provide neck and arm holes, while the lower panel-sections are preferably trapezoidal in shape.

In encasing the torso of the model in a shell made from the panel-sections, it has been found particularly advantageous to follow the order and mode of procedure about to be described. The lower back panel-section 12, which has theretofore been rendered limp and conformable, as by heat, is initially applied to the vest 1 at the back of the model, with the upper edge 13 of the panel-section coinciding with the style waistline 7 marked upon the vest. The panel-section 12 is stretched about the hips of the model so that the opposite side-margins 14 of the panel-section embrace and extend slightly beyond the hips toward the front side of the model, the panel-section adhering to the vest and being molded about the area of the natural back waistline and over the buttocks and hips, as outlined by the usual foundation garment worn by the model. The panel-section cools and hardens during manipulation thereof, and therefore retains the molded conformation. The thermoplastic sheet-material hereinbefore described lends itself peculiarly well to the molding procedure because of the elasticity thereof and the favorable hardening time factor incidental to the special thermoplastic composition employed. The adhesive quality of the panel-sections is also of assistance in molding the same, inasmuch as the panel-section thereby retains its applied position with respect to the style waistline 7 while said panel-section is being molded. However, it is to be understood that the adhesion of the panel-sections to the vest is such as to permit of ready separation of said elements after removal of the shell from the model. The side margins 14 of the applied panel-section 12 are trimmed off so as to extend over the hips a uniform distance slightly beyond the vertical side line marked upon the vest.

The lower front panel-section 10 in limp conformable condition, is now adhesively applied to the vest 1 at the front of the model, with the upper edge 15 of said panel-section 10 coinciding with the style waistline 7 in substantial horizontal alinement with the upper edge 13 of the back panel-section. The panel-section 10 is molded to assume the conformation of the model's abdomen and hips, the side margins 16 being trimmed vertically to slightly overlap the side margins 14 of the lower back panel-section 12, as illustrated in Figs. 7 and 8 of the drawings. By thus initially encasing the lower portion of the torso, the model derives therefrom a measure of support to maintain an erect standing position.

The upper back panel-section 11 is next applied in limp conformable condition, the neck cut-out 17 being applied to the collar 4 at the back of the neck and the shoulder margins 18 being applied to slightly overlap the shoulder-top markings of the vest 1. The panel-section 11 is molded to conform to the back of the model, the arm cut-outs 19 being shaped to partially define the arm holes, and the side margins 20 being caused to slightly overlap the vertical side line markings upon the vest 1. The lower margin 21 of the upper panel-section 11 is caused to overlap the upper edge 13 of the lower back panel-section 12 and also a portion of the lower front panel-section 10, surplus overlap being eliminated by suitably trimming the lower margin 21 and the side margins 20 of the upper back panel-section.

The upper front panel-section is applied last to the model and, as in the case of the upper back panel-section, the cut-out 22 is first applied to the collar 4 at the front of the neck, and the shoulder-margins 23 are applied to slightly overlap the margins 18 of the back section 11. The panel-section 9 is molded to conform to the chest, breasts and stomach of the model, the cut-outs 24 are molded to define the arm-apertures, and the side-margins 25 are trimmed to overlap the side-margins 20 of the upper back-section slightly beyond the vertical side line markings upon the vest 1. As illustrated in Fig. 7 of the drawings, the lower margin 26 of the upper front panel-section 9 is trimmed to overlap slightly the upper margin 15 of the lower front panel-section 10.

It is preferred to employ four panel-sections and to apply them to the model in the order described, because thereby the process of applying the panel-sections is not only expedited but it may be practiced with a minimum of discomfort to the model. However, it is to be understood that it is within the spirit of the invention not only to employ a greater or less number of panel-sections, but also to change the described order of their application to the model. The knitted base-fabric of the panel-sections has relatively different degrees of elasticity in transverse directions, the front and back upper panel-sections 9 and 11 being preferably cut so as to have maximum elasticity horizontally widthwise of the panel-sections, while the front and back lower panel-sections 10 and 12 have their maximum elasticity vertically lengthwise thereof.

When the panel-sections are rendered plastic, they contain the original elasticity characteristics of the base-fabric, and this feature of the panel-sections lends itself particularly well to conformation thereof to the contours of the model without producing objectionable ridges in the shell.

When the torso of the model has been completely encased in a shell, as illustrated in Fig. 6 of the drawings, the overlapped margins of the panel-sections thereof are marked by series of short lines 27 extending transversely across the exposed margins, as well as by lines (not shown) running along the edges of said exposed margins. This marking of the panel-sections provides for accurate reassembly of the sections after separation thereof. The lower margins of the front and back panel-sections of the shell are preferably trimmed to provide a horizontally even edge 28, although this trimming of the bottom margin of the shell may, if desired, be effected after removal of the shell from the model.

Having completed the molding of the shell and the marking of the overlapping margins of the sections thereof, the shoulder margins 23 and 18, and the overlapping side margins 25 and 20, and 16 and 14, are separated at one side of the model, as for example illustrated in Fig. 9 of the drawings, to expose the protective vest 1 between said margins. The vest 1 is now severed vertically, whereupon the separated shell-margins may be sprung further apart and the shell removed from the model. The remaining panel-section margins of the shell are then preferably also separated and the protective vest 1 removed entirely from the shell. The removal of the protective vest from the shell not only eliminates the unsightliness and the additional weight thereof, but it also facilitates reassembly of the shell-sections and reinforcement of the shell in desirable areas, as well as permitting treatment of the inner face of the shell along moisture proofing and heat-resistant lines.

The front upper section 9 and lower section 10 are now reassembled into their previously overlapped relationship by means of the marginal markings of said sections, and the overlapped margins are temporarily united by a plurality of staples as 29, illustrated in Fig. 10 of the drawings, to form a temporary front unit. The back upper section 11 and lower section 12 are similarly united by stapling to form a temporary back unit. The upper front section 9 is severed in coincidence with the upper margin 15 of the lower front section 10, the staples 29 are removed by a suitable tool, and the cut off margin 26 of the upper front section 9 is discarded.

The severed edge of the section 9 is now brought into abutting relationship with the upper edge 15 of the section 10, a reinforcing strip 30 of the thermoplastic sheet-material is placed against the inner faces of the sections in the area of the abutted edges thereof, and the joint is permanently secured by staples 31 which are preferably partially embedded in at least the outer face of the permanent front unit. The strip 30 may be adhesively attached to the shell-sections by a heated tool preferably applied to the inner face of said strip. The sections 11 and 12 of the temporary back unit are similarly united in edge-abutting relationship, with the joint reinforced and secured by stapling to form a permanent back unit. When adhesively attaching the strips as above described, the abutted edges of the panel-sections may be fused together to provide a continuous surface at the joint and without distortion of the form.

The corresponding side edges of the front and back units are then successively and similarly joined to complete assembly of the separated sections. The margins 16, 23 and 25 at one side of the front unit are brought into their previously overlapped relationship with the corresponding side margins 14, 18 and 20 of the back unit, and are temporarily secured together by staples. The overlapping margins are then severed substantially medianly of the width of the overlap, the temporary securing staples are withdrawn, and the surplus margins are discarded. The severed edges are then brought into abutting relationship, a strip 30, Fig. 11, of the thermoplastic sheet-material is placed against the inner face of the shell in the area of the joint, the joint is secured by staples 31, and the strip is adhesively attached and the abutted edges fused together to provide a continuous surface. The opposite margins of the unit are then similarly united, thus completing the assembly. In the process of assembling the shell-sections, measurements may be taken thereof and checked with measurements originally taken of the model, the required adjustments being effected, if necessary, when joining the sections to insure accurate sizes.

The bottom edge, having been properly trimmed, it is reinforced by a strip, as 32 of the thermoplastic sheet-material, the strip being adhesively applied to the inner face of the shell so that one side edge of the strip is even with the lower edge of the shell. Obviously, similar strips or otherwise shaped segments of the thermoplastic sheet-material may be additionally applied adhesively to the inner face of the shell to reinforce other areas, if desired.

The joints of the abutted shell-sections are preferably covered by thin tapes 33 applied adhesively to the outer face of the shell and of sufficient width to cover the outer portions of the staples 31. Likewise narrow tapes 34 are preferably applied to the outer face of the shell to indicate the natural waistline, as well as the front and back vertical center lines of the form. The markings afforded by the tapes 34 facilitate use of the form in the fitting of dresses thereto.

As illustrated in Figs. 12 and 14 of the drawings, the lower reinforced edge of the shell is bound by a tape 35 which also embraces the reinforcing strip 32. Likewise, the neck- and armhole edges are bound by tapes 36, as illustrated in Figs. 13 and 14. The shell is thereafter coated, preferably inside and outside, with a moisture-proofing and heat-resistant substance of any desired composition adapted for the purpose.

Having thus set forth the nature of the invention what we claim herein is:

1. In the process of making a dress-form or the like from a human model provided with a protective vest, including encasing the torso of a model in a hardened shell by applying to said vest and molding to the contours of the model a plurality of panel-sections of limp conformable sheet-material in marginally overlapped relation and having the property of hardening after application to the model, the improvement in the process which consists in separating overlapped margins of the shell thus formed to expose a portion of the protective vest from top to bottom thereof, severing said vest in the exposed portion thereof, together removing the shell and vest from the model, reassembling the separated shell-sections into their previously overlapped relation, severing sections of said shell along the overlapped margins thereof and abutting the edges of adjacent sections, and uniting the edge-abutted shell-sections.

2. In the process of making a dress-form or the like from a human model provided with a protective vest, including encasing the torso of a model in a hardened shell by applying to said vest and molding to the contours of the model a plurality of panel-sections of limp conformable sheet-material in marginally overlapped relation and having the property of hardening after application to the model, the improvement in the process which consists in separating overlapped margins of the shell thus formed, thereby to expose a portion of the protective vest from top to bottom thereof, severing said vest in the exposed portion thereof, together removing the shell and vest from the model, separating the remaining shell-sections and removing the vest therefrom, reassembling the separated shell-sections into their previously overlapped relation, severing sections of said shell along the overlapped margins thereof and abutting the edges of adjacent sections, and uniting the edge-abutted shell-sections.

3. The process of making a dress-form or the like from a model provided with a protective vest having marked thereon the style waistline of the model, consisting in applying to said vest and molding to the torso of said model back and front lower panel-sections of limp conformable sheet-material having the property of hardening after application, said panel-sections being applied so that their upper edges are disposed in substantial coincidence with said style waistline and so as to provide overlapped side margins, applying to said vest and molding to said model upper back and front panel-sections of said sheet-material in side margin overlapped relation and with the lower margins thereof overlapping the upper edges of said lower sections, thereby to form a hardened shell, dividing and removing the molded hardened shell from the model, removing the protective vest from the shell-sections, and then reassembling and uniting the shell-sections.

4. The process of making a dress-form or the like from a human model provided with a protective vest, consisting in encasing the torso of a model in a hardened shell by applying to said vest and molding to the contours of the model a plurality of marginally overlapping upper and lower front and back panel-sections of limp conformable sheet-material having the property of hardening after application to the model, the upper and lower of said panel-sections being overlapped substantially at the style waistline of the model, and the front and back panel-sections being overlapped at the sides of the model, separating the overlapped margins of the front and back panel-sections at one side of the shell thus formed, thereby to expose said vest from top to bottom, dividing said vest in the exposed portion thereof, together removing the shell and the vest from the model, removing the vest from the shell, and reuniting the divided shell.

5. In the process of making a dress-form or the like from a human model provided with a protective vest, including encasing the torso of a model in a hardened shell by applying to said vest and molding to the contours of the model a plurality of upper and lower front and back panel-sections of limp conformable sheet-material in marginally overlapped relation and having the property of hardening after application to the model, separating overlapped margins of the shell thus formed, thereby to expose a portion of said vest from top to bottom thereof, dividing said vest in the exposed portion thereof, and together removing the shell and the vest from the model, the improvement in the completion of the process consisting in separating the remaining shell-sections and removing the vest therefrom, reassembling into separate front and back units the upper and lower front shell-sections and the upper and lower back shell-sections into their previously overlapped relation, severing the upper from the lower section of each of said units along the overlapped margins thereof, uniting the upper and lower sections of the respective units in edge-abutted relation, reassembling the front and back units into the previously overlapped relation of the side margins thereof, severing the front unit from the back unit along the overlapped margins thereof, and uniting said front and back units in edge-abutted relation.

6. The process of making a dress-form or the like from a human model, consisting in molding to the contours of the torso of a model upper and lower front and back panel-sections of limp conformable sheet-material in marginally overlapped relation and having the property of hardening into a torso-encasing shell, separating the front unit comprising overlapped upper and lower front shell-sections from the back unit similarly comprising overlapped upper and lower back shell-sections, removing the shell from the model, severing from each other the shell-sections of the respective units along the overlapped margins thereof, reuniting the shell-sections of the respective units in edge-to-edge abutted relation of said sections, severing overlapped margins of the front and back units in their previously overlapped relation, and uniting said front and back units in edge-abutting relation.

7. The process of making a dress-form or the like from a human model, consisting in molding to the contours of the torso of a model a plurality of marginally overlapped sections of limp conformable sheet-material having the property of hardening into a torso-encasing shell, separating overlapped margins of sections of the molded and hardened shell lengthwise thereof and removing the shell from the model, severing the several shell-sections from each other along the overlapped margins thereof and in the initial overlapped relationship of said sections, thereby to provide edge-abutted shell-sections, and uniting said sections in edge-abutted relation by attaching strips of material to the inner faces and in the areas of the abutted edges of said shell-sections.

8. The process of making a dress-form or the like from a human model, consisting in molding to the contours of the torso of a model a plurality of marginally overlapped sections of limp conformable sheet-material having the property of hardening into a torso-encasing shell, separating overlapped margins of sections of the molded and hardened shell lengthwise thereof and removing the shell from the model, reassembling the separated shell-sections into the previously overlapped relation of the margins thereof, temporarily securing the overlapped margins of the shell-sections by stapling, severing said shell-sections from each other along the overlapped margins thereof, and uniting the sections of said shell in edge-to-edge abutting relation by stapling strips of material to the inner faces of abutting shell-sections in the areas of the abutted edges thereof.

9. The process of making a dress form or the like from a human model provided with a protective garment, consisting in encasing the torso of a model in a hardened shell by adhesively applying to said garment and molding to the contours of the model a plurality of marginally overlapping sections of limp conformable and tacky sheet-material having the property of hardening after application to the model, separating overlapping margins of the shell sections to expose a portion of said garment, dividing said garment in the exposed portion thereof, removing the shell from the model and said garment, and then uniting the shell sections.

RALPH F. PALMER.
KATHERINE C. SELBY.